D. C. SUMNER.

Cloth-Shearing Machine.

No. 9,188. Reissued May 4, 1880.

Witnesses:

John C. Tunbridge.

Willy G. E. Schultz.

Inventor:

D. C. Sumner by his attorney

A. V. Briesen

N. PETERS, PHOTO-LITHOGRAPHER, WASHINGTON, D. C.

UNITED STATES PATENT OFFICE.

DWIGHT C. SUMNER, OF MILLBURY, MASSACHUSETTS.

CLOTH-SHEARING MACHINE.

SPECIFICATION forming part of Reissued Letters Patent No. 9,188, dated May 4, 1880.

Original No. 216,984, dated July 1, 1879. Application for reissue filed February 16, 1880.

*To all whom it may concern:*

Be it known that I, DWIGHT C. SUMNER, of Millbury, in the county of Worcester and State of Massachusetts, have invented a new and useful Improvement in Cloth-Shearing Machines, of which the following is a specification.

This invention relates to an improvement in mechanism for finishing that class of cloth or pile fabric wherein the ornamentation is effected by shearing; and my invention consists, first, in a cylinder or revolver for cloth-shearing machines having sectional recessed or notched cutting-blades, the cutting-sections whereof are arranged around the cylinder in such order that every cutting-section is overlapped laterally by the section next following, or, in other words, the sections, instead of being placed in vertical rows or rings around the cylinder, are placed the one obliquely above or behind the other, thus producing novel results.

The invention also consists in the combination, with the ledger-blade and cloth-rest in a cloth-shearing machine, of a cylinder or revolver having notched or recessed shearing-blades, with cutting points or surfaces disposed in the above-mentioned oblique order around said cylinder, for the purpose hereinafter explained.

This improvement is applicable to ordinary cloth-shearing machines, and it will be understood that portions of the mechanism not herein shown or described may be constructed and operated in the usual manner.

Figure 1:
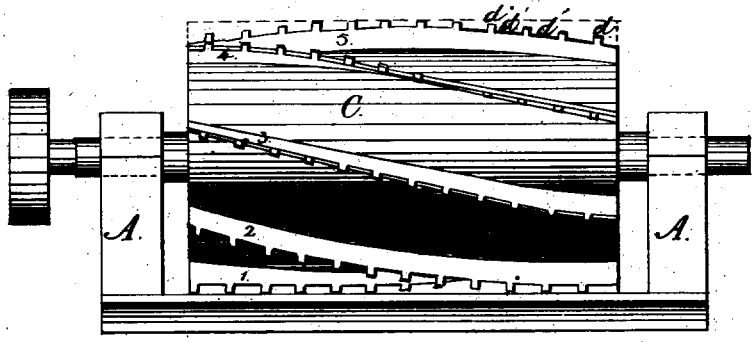
Figure 3:
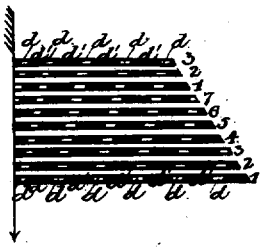
Figure 2:
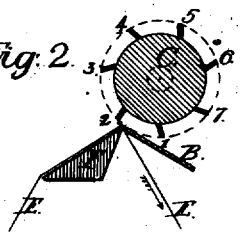
Figure 6:
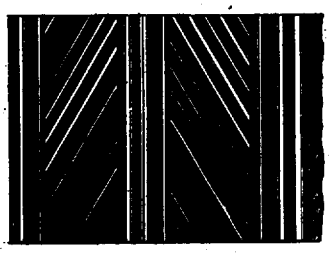
Figure 5:
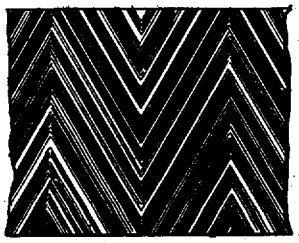
Figure 4:
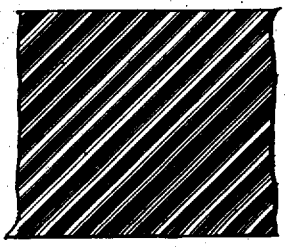

In the accompanying drawings, Figure 1 represents a front view of such parts of a cloth-shearing machine as are necessary to illustrate the nature of my improvements. Fig. 2 is a sectional diagram, showing the relative positions of the working parts in the machine. Fig. 3 is a cutter-face diagram, showing the manner in which the cutting-sections of the blades follow each other; and Figs. 4, 5, and 6 illustrate styles of finish on the surface of the cloth produced by my invention.

Referring to the drawings, A denotes the adjustable top frame of a shearing-machine. B indicates the stationary ledger-blade. C represents the revolver or blade cylinder, provided with the radiating blades 1 2 3 4 5 6 7, the edges of which blades have cutting-sections *d* and notches *d'*. The cutting-sections *d* of the several blades I arrange around the cylinder in oblique order, so that if a circle be drawn around the cylinder through the center of a cutting-section on one of the blades the center of the sections in the path of the circle on the adjoining blades will fall out of the line of said circle, so that each succeeding section is offset from the line of revolution of the one in advance of it. In other words, the cutting-sections on one blade are followed in oblique direction by those on the next blade. By this arrangement of the cutting-sections *d* the shearing action against the ledger-blade B effects the production of oblique or diagonal lines in the pile or face fibers of the cloth E as it is fed forward over the straight cloth-rest F, the inclination of the diagonal depending on the relative speed of the shearing and feeding mechanism and the lateral offset of the cutting-sections.

Right-hand or left-hand diagonal lines may be formed accordingly as the cutting-sections *d* are set toward the right-hand or left-hand end of the blade-cylinder.

The cutting points or sections *d* may be formed in continuous series throughout the entire length of the cylinder or on certain definite portions of its length, as desired, for producing long or short diagonal lines on the surface of the cloth.

Plain diagonal, as shown in Fig. 4, is formed by arranging the cutting-sections *d* in continuous helical or spiral series from end to end of the cylinder.

By forming the sections *d* in alternating right and left hand helical or zigzag portions of determined lengths along the blade-cylinder, alternating diagonals, as shown in Fig. 5, may be produced, while by forming the sections *d* in spiral or helical series only on occasional portions of the cylinder or revolver C the diagonal is produced as occasional stripes, as illustrated in Fig. 6.

The diagonal ornamentation formed by the arrangement of the cutting-sections circumferentially (partially or entirely) in helical order is susceptible of very fine and delicate delineation on the goods, and produces a very desirable finish at a slight expense, while the style of the diagonal design or patterns which can be produced by mechanism such as herein described admits of considerable variety, since the patterns may be varied by a modification in the pitch or direction of the line on which the cutting points or sections are arranged, by changing the width or relative sizes of the cutting-sections and recesses, and by variations in the movement of the cloth past the shearing-blades.

I am aware that diagonal lines have heretofore been made in the pile of fabrics by shearing with ordinary blades, by the aid of a spiral revolving cloth-rest in place of the straight rest F, and I do not, therefore, make claim, broadly, to the production of diagonal lines.

I claim—

1. A revolver or blade-cylinder for cloth-shearing machines having notched cutting-blades, the cutting-sections whereof are arranged circumferentially in oblique order to produce oblique or diagonal furrows, substantially as described.

2. In a cloth-shearing machine, the combination, with the ledger-blade and cloth-rest, of a cylinder the blades of which are notched as described, whereby a series of cutting points or sections are arranged in oblique order around the said cylinder, substantially as described.

3. A cylinder for shearing-machines the blades of which are notched, as described, and have cutting-sections developed around the cylinder in helical order, substantially as described.

DWIGHT C. SUMNER.

Witnesses:
ISAAC D. GOULDING,
GEORGE W. PARSONS.